[2,844,503]

United States Patent Office

Patented July 22, 1958

2,844,503

1,1-DIMETHYL-2,2-DI-(1-CYANOETHYL) HYDRAZINE, METHOD OF PREPARING, AND COMPOSITIONS AND METHOD FOR CONTROLLING NEMATODES

Robert P. Parker, Ridgewood, and John F. Hosler, Bound Brook, N. J., assignors to American Cyanamid Company, New York, N. Y., a corporation of Maine No Drawing. Application March 26, 1956
Serial No. 573,602

5 Claims. (Cl. 167—22)

This invention relates to a new and novel di-cyanoethyl hydrazine and to a method for its preparation. More particularly, it relates to the compound 1,1-dimethyl-2,2-di-(1-cyanoethyl) hydrazine characterized by the formula:

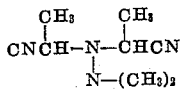

The di-cyanoethyl hydrazine of the present invention may be prepared by reacting one mol of dimethyl hydrazine with two mols of lactonitrile at temperatures from about 0° C. to about 100° C. until dehydration is complete. The reaction may be illustrated by the general equation:

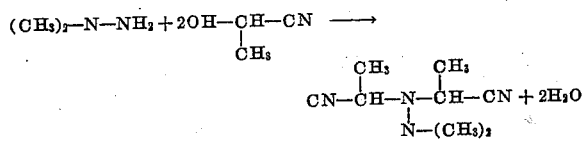

The hydrazine derivative of the present invention is a solid which is insoluble in water but soluble in most organic solvents, such as benzene and kerosene. Its melting point is 90° C.–91° C. It is useful in soil treatments as a fungicide or nematocide.

Nematodes are widely distributed in many soils. Soil nematodes are notoriously injurious to both plant and tree crops. The hydrazine derivative of the invention is an essential active component of a nematocidal composition. It is contemplated that a preferred practice will be to apply the hydrazine in concentrations between 0.001% and 0.01%, although more or less may be used. The compound may be admixed with inert solid carriers, such as fuller's earth, pyrophyllite, talc, diatomaceous earth and the like. Alternatively, the compound may be added to water-immiscible organic solvents or aerosol sprays.

The concentration of the 1,1-dimethyl-2,2-di-(1-cyanoethyl) hydrazine in a dusting composition will be widely varied, depending upon the manner in which the composition is to be applied. In general, a useful dusting composition will contain from as little as about 0.01% to as much as about 90% of the di-cyanoethyl derivative. Compositions vary depending on whether subsequent dilution before use is intended. The remainder is usually a solid inert carrier, but in some cases a supplemental active ingredient for some other purpose may be combined therewith. Such may include fertilizing and soil-conditioning materials.

According to the present invention, the di-cyanoethyl hydrazine compositions are applied to soil at rates ranging from about 50 to about 300 pounds of the active hydrazine toxicant per acre. Within this range, rates from about 100 to about 200 pounds per acre will generally be found to produce good results.

It is an advantage of the present invention that aqueous emulsion compositions may be prepared by dissolving the aforedescribed di-cyanoethyl hydrazine in a suitable, water-insoluble organic solvent such as benzene, kerosene or other normally liquid hydrocarbon solvent. This solution is thoroughly stirred into water which contains a wetting agent. Illustrative wetting agents are, for instance, sodium dioctyl sulfosuccinate (Aerosol OT) and alkylaryl polyether alcohols, such as Triton X-100. Many equivalent compounds for this purpose are well known and available in commerce.

The following examples will serve to illustrate the preferred embodiments of the invention, wherein the di-cyanoethyl hydrazine is prepared and utilized in a nematocidal and fungicidal composition. Unless otherwise stated, the parts given are by weight.

EXAMPLE 1

6 parts of dimethyl hydrazine and 14.2 parts of lactonitrile are stirred slowly in suitable apparatus and heated over a steam bath for about three hours until the reaction is complete. The reaction mixture is then extracted with water and the residue is recrystallized from ethanol and dried. A good yield of 1,1-dimethyl-2,2-di-(1-cyanoethyl) hydrazine having a melting point of 90° C–91° C. is obtained. Upon analysis, it is found that 57.3% C, 8.74% H and 31.8% N are present.

EXAMPLE 2

(A) An aqueous suspension of 100 Anguillula nematodes in 4 cc. water containing 0.001% by weight of the compound as prepared in the preceding example is added to a vial.

(B) A second aqueous suspension of 100 Anguillula nematodes in 4 cc. water containing 0.0001% by weight of the compound as prepared in Example 1 is added to a vial.

Each of the vials is rotated for 20 hours. The percent demise of the nematodes in the (A) vial is 100% and the result in (B) vial is 25%.

EXAMPLE 3

The fungicidal activity of 1,1-dimethyl-2,2-di-(1-cyanoethyl) hydrazine is tested against the spores of *Sclerotinia fructigena* and *Macrosporium sarcinaeforme* in a concentration of approximately 50,000 spores per cc. of water. For each of the fungus species, 0.25 cc. of spore suspension and 3.75 cc. of aqueous suspension containing the compound as prepared in Example 1 in varying proportions as indicated below are added to a 4 cc. vial, stoppered and rotated for 20 hours. The spores are then removed and examined microscopically to determine germination.

The following table summarizes the data obtained.

Table 1

| *Sclerotinia fructigena* | | *Macrosporium sarcinaeforme* | |
|---|---|---|---|
| Percent Conc. | Percent Kill | Percent Conc. | Percent Kill |
| 0.01 | 100 | 0.001 | 100 |
| 0.001 | 0 | 0.0001 | 25 |

EXAMPLE 4

1,1-dimethyl-2,2-di-(1-cyanoethyl) hydrazine is admixed on fuller's earth in the proportion of 25 parts of compound dihydrazine and 100 parts of fuller's earth.

A field to be planted with corn is dusted with the composition as prepared above at the rate of 750 pounds per acre. This corresponds to 150 pounds of the active intoxicant per acre. The field is subsequently plowed.

The composition is found to be effective in combating the nematodes in the soil. There is a marked improvement in the stand of the plants as compared with the untreated soil.

We claim:

1. As a new composition of matter: 1,1-dimethyl-2,2-di(1-cyanoethyl) hydrazine.

2. The method for preparing 1,1-dimethyl-2,2-di-(1-cyanoethyl) hydrazine which comprises: condensing one mol of hydrazine with two mols of lactonitrile at a temperature of from about 0° C. to about 100° C. to thereby form 1,1-dimethyl-2,2-di-(1-cyanoethyl) hydrazine, and thereafter recovering said hydrazine.

3. A nematocidal composition comprising a pesticidal adjuvant as an inert carrier, and as the essential active ingredient the compound: 1,1-dimethyl-2,2-di-(1cyanoethyl) hydrazine.

4. A method for controlling plant and tree damage caused by nematodes comprising the step of applying to a nematode-infested soil a composition containing 1,1-dimethyl-2,2-di-(1-cyanoethyl) hydrazine as the active ingredient.

5. A method for controlling plant and tree damage caused by nematodes comprising the step of applying to a nematode-infested soil a composition containing 1,1-dimethyl-2,2-di-(1-cyanoethyl) hydrazine as the active ingredient, the latter being applied at a rate of from about 50 to about 300 pounds per acre.

References Cited in the file of this patent

UNITED STATES PATENTS

| 2,579,580 | Howk | Dec. 25, 1951 |
| 2,659,688 | Soule | Nov. 17, 1953 |
| 2,663,664 | Shore | Dec. 22, 1953 |

FOREIGN PATENTS

| 744,675 | Great Britain | Feb. 15, 1956 |